United States Patent Office 3,002,247
Patented Oct. 3, 1961

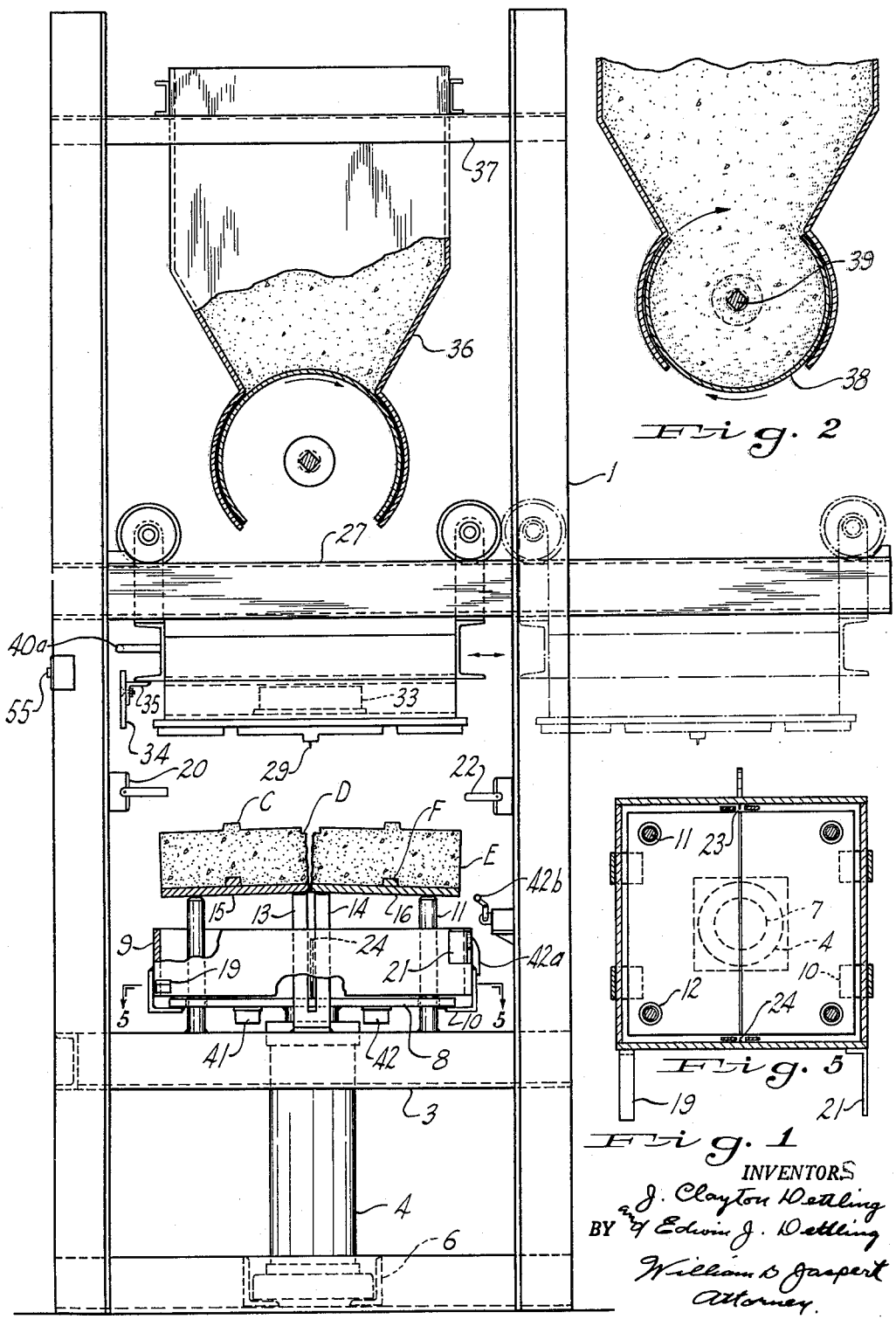

3,002,247
APPARATUS FOR FORMING CONCRETE BLOCKS
James Clayton Dettling, 915 Osage Road, and Edwin J. Dettling, 2535 Allender Ave., both of Pittsburgh, Pa.
Filed Jan. 24, 1958, Ser. No. 710,931
4 Claims. (Cl. 25—41)

This invention relates to an apparatus for molding shapes by subjecting the material of which they are made to vibration and pressure simultaneously, and it is a primary object of the invention to apply the vibratory forces to the material being molded in a manner to avoid compacting the same before it is molded to shape.

It is among the objects of this invention to provide an apparatus for producing concrete slabs from a relatively dry mix of sand, aggregate and cement in which the product, upon completion of the molding operation, has sufficient strength in its wet state to be handled for stacking and curing to effect a rapid setting of the cement and seasoning of the molded article within a minimum time.

It is a further object of the invention to provide means of feeding the molding compound to the molds in a manner to prevent compacting the material while it is being handled in the mixing thereof and during its delivery to the mold.

It is still another object of the invention to provide apparatus whereby the shape to be molded is formed on a platen having a matrix surface which also functions as a pallet for handling the finished molded shapes for additional treatment and drying.

It is still a further object of the invention to provide apparatus consisting of a mold box with top and bottom pressure platens, there being two bottom platens which are tilted to fracture when it is stripped from the mold.

It is still a further object of the invention to provide apparatus for molding shapes as hereinbefore described in which the movable elements may be accelerated during a portion of their travel and subjected to greater pressure during the molding step when the movable mold parts are subjected to much slower travel.

It is still another object of the invention to provide apparatus as hereinbefore set forth employing a hopper with means for measuring a mold charge without the additional handling of the material as it is fed from the hopper.

The invention further contemplates the use of solenoid operated valve mechanism whereby the proper sequence of operations is automatically maintained.

These and other objects of the invention will become more apparent from a consideration of the accompanying drawings constituting a part hereof in which like reference characters designate like parts and in which:

FIGURE 1 is a side elevational view of molding apparatus embodying the principles of the invention taken along the line 1—1, FIGURE 4;

FIGURE 2, a vertical cross-sectional view of a portion of a feed hopper and measuring device for the molding composition;

FIGURE 5, a longitudinal section taken along the line 5—5, FIGURE 1.

Figure 3:
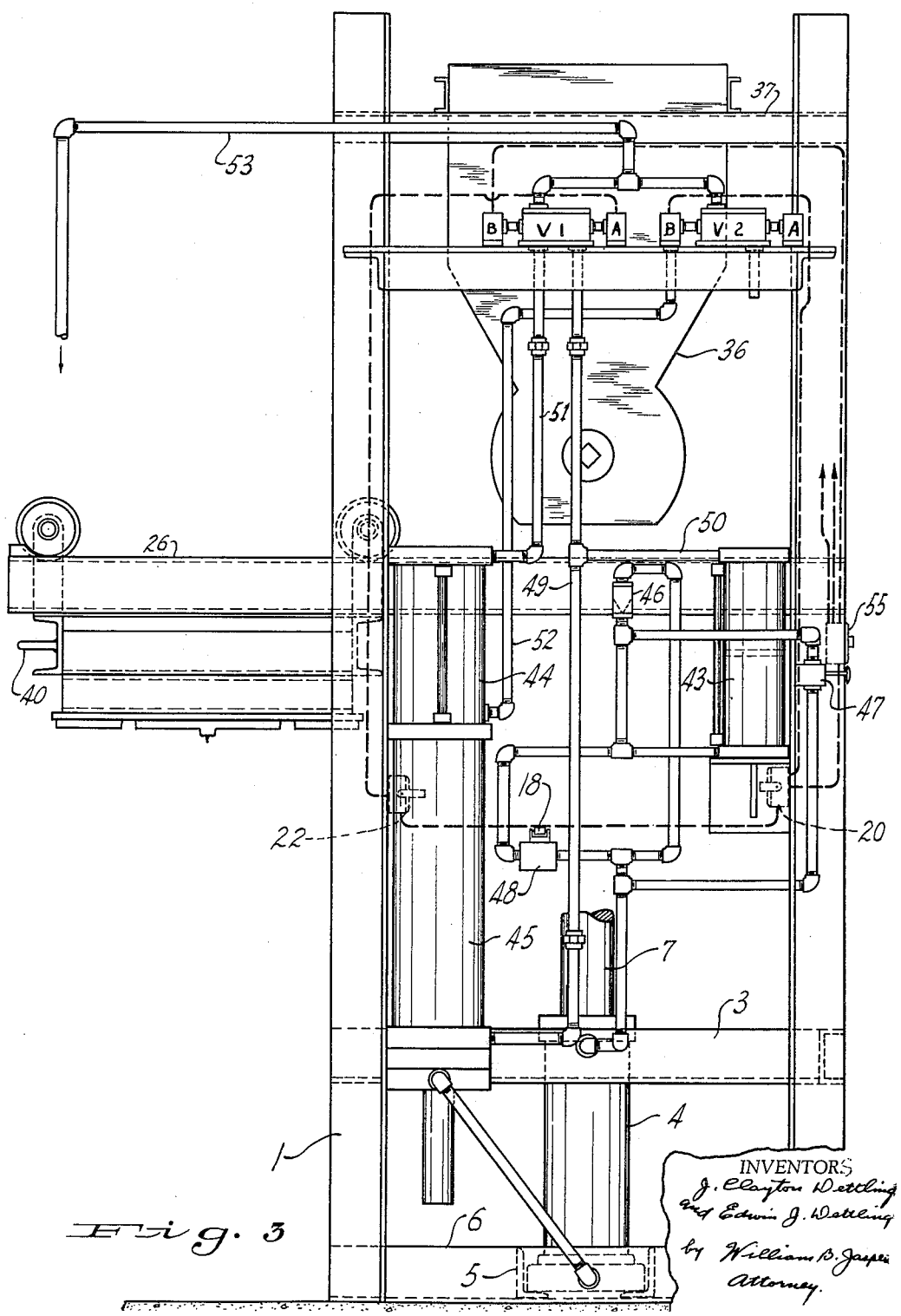
FIGURE 3 is a side elevational view taken along the line 3—3, FIGURE 4.
Figure 4:
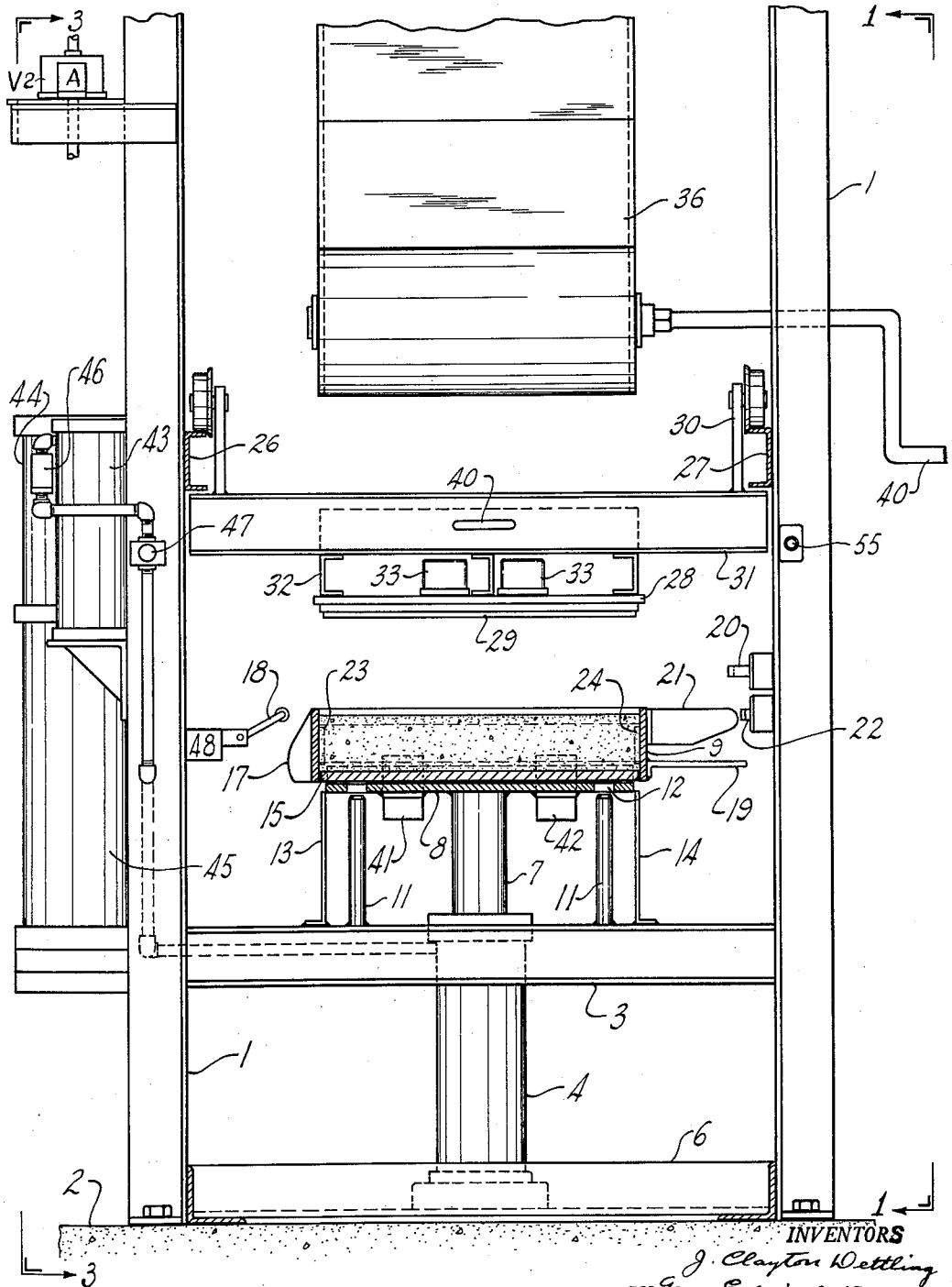
FIGURE 4 is a front elevational view thereof.

Referring to FIGURE 4, the apparatus consists of structural steel angle bars 1 which constitute the main frames that are set on a concrete base 2, cross frames 3 extend across the uprights 1 and are secured thereto by welding, and a fluid pressure cylinder 4 is supported on angles 5, FIGURE 3 and likewise tied in with the frames 1 by angles 6. A piston 7 supports a mold box consisting of a plate 8 supported on the piston 7, and the mold walls 9 which are secured to the plate 8 by angles 10 as shown in FIGURE 1. Stationary posts 11 are supported on the cross-frame 3, FIGURE 4, the posts 11 extending through openings 12 in the bottom plate 8, there being four openings in plate 8 and four posts as shown in FIGURE 5 of the drawing. Also supported on the cross-frame 3 are a plurality of fingers 13 and 14 which engage platens 15 and 16 to cause them to tilt while resting on posts 11, in the manner shown in FIGURE 1 of the drawings. The mold box is provided with several cams including a cam 17 that actuates lever 18 of a valve V4 which automatically stops the mold box travel upward at the loading position and the opposite side of the mold box is provided with a lever 19 that engages limit switch 20. A trip 21 engages limit switch 22.

As shown in FIGURES 1, 4 and 5, the mold box is provided with cutters 23 and 24 that kerf the edges of the molded blocks so that they are more readily broken exactly in the center, as will be hereinafter explained. Mounted on a rail or track consisting of channels 26 and 27 is a pressure platen 28 that is provided with a knife edge 29 in alignment with kerf cutters 23 and 24 as is more clearly shown in FIGURE 1. The pressure platen constitutes a matrix for shaping the top of the molded blocks in the manner shown in FIGURE 1 with tongues C and a central groove which gives the appearance of a mortar joint D when the broken blocks E are laid in superposed courses. The bottom platens 15 and 16 are provided with tongues F to form grooves in the blocks E. The platen 28 is suspended by hangers 30, FIGURE 4, which support channels 31 to which the pressure platen is connected by cross-channels 32. A pair of vibrators 33 are mounted on the pressure platen for a purpose to be hereinafter explained. Attached to the front of the platen is what may be termed a screed designated by the numeral 34 attached to the channel by means of an angle bar 35, FIGURE 1. The screed functions to scrape or level off the charge in the mold box as will be hereinafter explained.

As shown by dotted lines in FIGURE 1, the channel tracks 26 and 27 extend a sufficient distance beyond the frame 1 to permit moving the pressure platen and its support entirely out of the way so that material may be charged from a measuring hopper 36, which is mounted on a cross rail 37 above the machine. This hopper contains a cylindrical valve 38 mounted on axle 39 which is provided with a crank or wheel 40 by which it may be rotated. In the position of the valve 38 shown in FIGURE 2, the hopper feeds the molding composition into the cylindrical chamber of the valve which is of a capacity corresponding to the mold charge so that when the pressure platen is pushed out of the way, as shown in dotted lines in FIGURE 1, valve 38 is rotated and its contents dumped into the mold box as shown in FIGURE 4 of the drawing. When the platen is then pulled forward by means of the handle 40a, FIGURE 1, the screed 34 will level off the material that was dumped in the mold box as the pressure platen is drawn or pulled to the molding position above the mold box. Attached underneath the mold box are a pair of vibrators 41 and 42 which, when energized, vibrate the mold box to compact the composition contained therein and the vibrators 33 of the pressure platen 28 likewise subject the latter to vibration so that it will produce a sharp outline of its molding surface on the upper face of the molded slabs or composition. Vibrators 33 and 41 and 42 are energized when cam 42a on the mold box, FIGURE 1, strikes switch 42b.

The apparatus is operated by oil and air tanks 43 and 44 and a large booster tank 45, the tank 43 being connected through valves 46, 47 and 48 to the operating cylinder 4. The booster tank 54 is also connected by a line 49 and a connection 50 to tank 43 and to the valve designated V1. Valve V1 has a return line 51 connected to the tank 44 and another line 52 connects that tank with valve V2, both valves V1 and V2 having a connection 53 with a compressor, not shown. The valve 47, FIGURES 3 and 4, bypasses the valve 48 which is the stop valve for holding the mold box 9 in loading position. By pressing the button of valve 47, the mold box will continue to raise to effect engagement with the pressure platen 28 and complete the molding operation. Limit switches 20 and 22 are electrically connected to solenoids designated B and A of valves V1 and V2 and these solenoids are electrically connected to a push button switch 55.

In the operation of the above-described molding apparatus, push button switch 55 is depressed, which energizes solenoid B of valve 1, FIGURE 3. Air enters the booster oil tank through V1 forcing oil through the booster into the bottom of the cylinder 4 and the cylinder raises the piston 7 until cam 17 strikes lever 18 of valve 48 which closes the valve and stops the movement of the piston at the loading height or station of the mold box. Pallets 15 and 16 are then placed in the mold box side by side and the measuring drum 38 will be rotated by turning the crank 40, dumping its contents on top of the pallets in the mold box and the drum is then returned to the position shown in FIGURE 1, which shuts off the flow of the molding composition. The matrix or pressure platen 28 suspended by hangers 30 from the tracks 26 and 27 is then pulled forward to a position directly above the mold and as it moves forward the screed 34, FIGURE 1, will level off the charged material in the mold box. The operator then pushes the button of valve 47, FIGURE 4, causing the piston 7 to advance until the molding composition in the box 9 contacts the pressure platen or matrix 28 and just at the instant of contact of the matrix with the molding composition, cam 42a engages arm 42b and the vibrators 33, 41 and 42 are energized to subject the matrix and the molding composition to vibratory movement while the material is being compressed in the mold box.

The piston element 7 continues to advance until limit switch 20, FIGURE 4, is tripped by arm 19 which energizes solenoid B, valve 2, FIGURE 3, and opens valve 2, allowing air to enter booster for high pressure application to the power cylinder 4 which automatically controls the thickness of the molded product. At the end of the high pressure stroke, limit switch 22, FIGURE 3, is tripped by the arm 21 on the mold box to energize solenoids A of valves V1 and V2, reversing the valves and allowing air to enter oil return tank which is the tank 43 that causes the piston 7 of cylinder 4 to retract. As the mold box is lowered, the pallets 15 and 16 will engage the strips or fingers 13 and 14 and also the posts 11, which project through the openings 12 in the bottom of the mold box. Since the strips 13 and 14 are higher than the posts 11, the platens will be pressed upward at their point of contact. The knife edge 29 and the cutters 24 have scored the molded block to control the line of split which is accomplished when the molded art or slab comes to rest on the slightly higher center fingers 13 and 14, as is shown in FIGURE 1.

The position of the finished slabs is shown in FIGURE 1, and a pallet truck with tines capable of being inserted in the space between the pallets 15 and 16 and the top of the mold box lifts the pallets with the broken molded slabs and removes them to storage or drying racks for further treatment such as steam treating or other tempering and setting treatments to expedite the setting of the molding composition.

The invention has been demonstrated in the making of concrete slabs from sand, aggregate and Portland cement, this composition being thoroughly mixed with very little water so that the mixture is rather dry. It is carefully esculated to the hopper 36 in which it is discharged without, in any way, compressing the material or handling it in a manner where it would become compacted.

It has been found that after the relatively dry material is charged into the mold box and the matrix or pressure platen is brought to bear on the charged composition, the material is entirely compacted by the pressure in the operating cylinder as boosted by the booster cylinder if the material and the matrix is simultaneously subjected to vibratory action. The vibrators 33 and 41 and 42 serve this purpose.

While the use of vibrators is not new, the application thereof to the matrix in addition to the mold box is deemed to be novel. It has been found that if the vibrator is applied only to the mold box containing the molding composition, the material will compact so that it is difficult to get a true impression from the matrix surface of the pressure platen with the pressure forces that are available in the average mold machine. We have found that by applying vibratory forces to the matrix itself, this difficulty is overcome. I have also discovered that sharp grooves and tongues, weep holes and cutters may be formed in slabs by applying vibratory forces to the matrix alone. However, by applying vibration to both the matrix and the molding composition simultaneously, a stronger green slab will result which is more susceptible to the scoring and splitting forces applied by the cutters and the posts and fingers for raising and tilting the pallets such as the pallets 15 and 16 in the manner shown in FIGURE 1.

Although the invention has been described in connection with the molding of cement slabs or blocks, it is evident that it may be used in molding other compositions and other shapes.

Although one embodiment of the invention has been herein illustrated and described, it will be evident that various modifications may be made in the details of construction without departing from the principles herein set forth.

What is claimed is:

1. Apparatus for forming concrete blocks from a relatively dry mix of sand, aggregate and cement comprising, a frame, a mold box mounted on said frame for vertical movement above a fixed member, said box having a bottom plate and side walls, said plate having spaced openings for receiving a plurality of pallet supports that extend from said fixed member, a pair of disjointed imperforate pallets, each one-half the size of the space between the walls of said mold box resting on said bottom plate with their juxtaposed edges abutting, tilting fingers for engaging said pair of pallets adjacent their abutting edges, said fingers being of a height greater than the height of said pallet supports, a pressure platen movably mounted on said frame and horizontally movable to and from a position over said mold and fixed against vertical movement and being of the shape and size of the total area of said pair of pallets in vertical alignment with said mold box, means for charging said mold box with said dry mix mounted on said frame and above said mold box and pressure platen, means engaging said mold box for raising said mold box to force the charge into pressure contact with said pressure platen to mold the block, and means for lowering the mold box to effect engagement of the pallets first with said tilting fingers and subsequently with said pallet supports to raise the pallets above the mold walls and tilt the pallets to thereby strip the molded block from the mold and split it into a pair of blocks with a rough stone-like texture on the split faces thereof.

2. Apparatus for forming concrete blocks from a relatively dry mix of sand, aggregate and cement comprising a frame, a mold box mounted on said frame for vertical movement above a fixed member, said box having a bottom plate and side walls, said bottom plate having spaced openings for receiving posts extending upward from said fixed member, a plurality of tilting fingers extending beyond the ends of the posts, a pair of disjointed imperforate pallets, each one-half the size of the space within the side walls of said mold box resting on said bottom plate with the meeting edges of said pallets in alignment with said tilting fingers, a pressure platen movably mounted on said frame and horizontally movable to and from a position over said mold and fixed against vertical movement above said mold and being of the shape and size of the total area of said pair of pallets in vertical alignment with said mold box, means mounted on said frame and above said mold box and pressure platen for charging said mold box with said dry mix when said pair of pallets are resting on said bottom plate, means engaging said mold box for raising said mold box above said tilting fingers and posts to force the charge into pressure contact with said pressure platen to mold the block, and means for lowering the mold box to effect engagement of the pallets with said fingers and posts to raise the pallets above the mold walls and tilt them from the center down to thereby strip the molded block from the mold and simultaneously split it into a pair of blocks with a rough stone-like texture on the split faces thereof.

3. Apparatus as set forth in claim 1 in which the pressure platen is provided with means for subjecting it to vibration as it makes contact with the mold charge.

4. Apparatus as set forth in claim 1 in which the pressure platen and mold box are provided with means for subjecting them to vibration at the time the mold charge makes contact with said pressure platen.

References Cited in the file of this patent

UNITED STATES PATENTS

| | | |
|---|---|---|
| 1,005,884 | Ross | Oct. 17, 1911 |
| 1,349,017 | Talbot | Aug. 10, 1920 |
| 1,399,325 | Straub | Dec. 6, 1921 |
| 1,494,953 | Cross | May 20, 1924 |
| 1,875,258 | Oliver | Aug. 30, 1932 |
| 2,341,012 | Billman | Feb. 8, 1944 |
| 2,366,780 | Gelbman et al. | Jan. 9, 1945 |
| 2,446,061 | Reed | July 27, 1948 |
| 2,470,377 | Shepeck | May 17, 1949 |
| 2,512,092 | Dike | June 20, 1950 |
| 2,685,116 | Schutt | Aug. 3, 1954 |
| 2,706,843 | Davis | Apr. 26, 1955 |
| 2,810,946 | Garnich | Oct. 29, 1957 |
| 2,870,512 | Branham | Jan. 27, 1959 |

FOREIGN PATENTS

| | | |
|---|---|---|
| 338,557 | France | Dec. 31, 1903 |
| 545,912 | France | Aug. 4, 1922 |